United States Patent Office 2,897,169
Patented July 28, 1959

2,897,169

PLASTICIZED POLYVINYL HALIDE POLYMERS

Joachim Dazzi, Dayton, Ohio, assignor to Monsanto Chemical Company, St. Louis, Mo., a corporation of Delaware No Drawing. Application July 9, 1956
Serial No. 596,427

6 Claims. (Cl. 260—31.4)

This invention relates to compositions comprising polymers of vinyl halides and relates more particularly to flexible compositions comprising vinyl chloride polymers plasticized with certain fumarate or maleate polymers.

A wide variety of plasticizers has been employed for the purpose of improving the physical properties of polyvinyl chloride. Particular attention has been given to the improvement of flexibility and heat and light stability of such plasticized compositions. In many instances the improvement in flexibility has been obtainable only by sacrificing other desirable properties of an ideal polyvinyl chloride composition, such as solvent-resistance, color and heat stability, water absorption, etc.

Now I have found that very good flexibility, without sacrifice of other desirable properties, is imparted to polyvinyl chloride when there is employed as a plasticizer therefor a preformed polymeric dicarboxylate selected from the class consisting of homopolymers and copolymers of esters of the formula:

in which R and R' are selected from the class consisting of alkyl radicals of from 1 to 8 carbon atoms and alkoxyalkyl radicals of from 3 to 6 carbon atoms, said copolymers consisting only of said esters.

As examples of dicarboxylate polymers useful for the present purpose may be mentioned polymeric diethyl, dibutyl, diamyl, di-n-hexyl or di-n-octyl fumarate, polymeric dimethyl, diisopropyl, di-tert-butyl or diamyl maleate, polymeric bis(methoxyethyl) fumarate, polymeric bis(2-ethoxyethyl) maleate; copolymers such as the copolymer of diethyl fumarate and di-n-butyl fumarate, of di-n-propyl maleate and di-n-propyl fumarate, or of dimethyl fumarate and bis(4-butoxyethyl) maleate; or polymers or copolymers of such mixed esters as polymeric ethyl isopropyl fumarate, polymeric n-butyl 2-ethoxyethyl maleate, the copolymer of ethyl butyl fumarate and bis(2-ethoxyethyl) fumarate or the copolymer of methyl n-hexyl maleate and ethyl isoamyl maleate.

The presently useful fumarate or maleate polymers are of outstanding value as plasticizers, these dicarboxylate polymers serving not only to soften polyvinyl chloride, but also to impart simultaneously a high degree of low temperature flexibility, heat-stability and solvent-resistance. The present fumarate and maleate polymers are compatible with polyvinyl chloride and show no exudation of the polymeric plasticizer even at high concentrations.

Although the quantity of dicarboxylate polymer will depend upon the properties desired for the plasticized composition, it is generally found that compositions having from 5 percent to 50 percent by weight of the dicarboxylate polymer will, in most cases, be satisfactory for general utility. The good flexibility of the plasticized compositions increases with increasing plasticizer concentration. The present invention thus provides a highly efficient method of preparing a flexible composition from polyvinyl chloride which comprises mechanically mixing from 50 to 95 parts by weight of the preformed polyvinyl chloride with from 50 to 5 parts by weight of a preformed polymeric dicarboxylate selected from the class consisting of homopolymers and copolymers of esters of the formula:

in which R and R' are as herein defined. By the terms "preformed polyvinyl chloride" and "preformed polymeric dicarboxylate" as herein employed it is meant in both instances that the polyvinyl chloride and the polymeric dicarboxylate had been formed in the absence of each other, previous to the mechanical mixing step.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i.e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized compositions usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is a modified carbon absorption test of the Society of Chemical Industry.

*Example 1*

Di-n-butyl fumarate was polymerized by heating 100 g. of the ester at a temperature of 260–270° C. for 5 hours. Fractionation of the resulting reaction mixture gave a low molecular weight polymeric di-n-butyl fumarate, B.P. 240–300° C. at 2 mm., and as residue a higher molecular weight polymeric di-n-butyl fumarate. The low molecular weight polymer is designated as polymer I in the tests described in Example 9 and the higher molecular weight polymeric residue as polymer II in the tests of Example 9.

*Example 2*

Di-n-butyl maleate was subjected to catalytic polymerization by maintaining a mixture of 342 g. (1.5 moles)

of the maleate and 3.4 ml. of di-tert-butyl peroxide at a temperature of 155-160° C. for about 6 hours. Distillation of the resulting reaction mixture gave a fraction, B.P. 190-225° C. at 0.9 mm., comprising a low molecular weight di-n-butyl maleate which fraction was labeled polymer III, and as residue a higher molecular weight polymeric di-n-butyl maleate which was labeled polymer IV.

Example 3

This example describes thermal polymerization of di-n-butyl maleate. The maleate (0.75 mole, 171 g.) was polymerized by heating it in a nitrogen atmosphere at a temperature of 261-272° C. for about 4 hours. Distillation of the reaction mixture gave a fraction, B.P. 200-230° C. at 0.9-0.3 mm., which comprised low molecular weight polymeric di-n-butyl maleate. This was labeled polymer V. The residue, comprising a higher molecular weight polymeric di-n-butyl maleate, was labeled polymer VI.

Example 4

Diethyl fumarate was subjected to catalytic polymerization by heating 258 g. (1.5 moles) of the fumarate with 1 percent (2.6 g.) of di-tert-butyl peroxide for about a half hour at a temperature around 166° C. Distillation of the resulting material gave a fraction, B.P. 180-215° C. at 1.0 mm., comprising a low molecular polymeric diethyl fumarate. This fraction was labeled polymer VII.

Example 5

Di-n-propyl fumarate (300 g.) was polymerized by heating it in a nitrogen atmosphere for about 5 hours at a temperature of 242-262° C. Distillation gave a fraction, B.P. 200-220° C. at 1.2 mm., which consisted of a low molecular weight polymeric di-n-propyl fumarate. This fraction was labeled polymer VIII. The residue comprising higher molecular weight polymeric di-n-propyl fumarate was labeled polymer IX.

Example 6

Di-n-hexyl maleate (370 g., 1.3 moles) was polymerized in the presence of a total of 10.4 ml. of di-tert-butyl peroxide at a temperature of 155-168° C. for about 7.5 hours. The peroxide was added to the reaction mixture in three portions during this time. Fractionation gave a low molecular weight polymeric di-n-hexyl maleate B.P. 210-229° C. at 2 mm., which was labeled polymer X.

Example 7

A copolymer of di-n-butyl maleate and di-n-butyl fumarate was prepared by heating 171 g. (0.75 mole) of the fumarate with a like quantity of the maleate in the presence of 9.4 ml. of di-tert-butyl peroxide for about 3.5 hours at a temperature of 155-161° C. Distillation of the resulting reaction mixture to remove material boiling below 243° C. at 2 mm., gave as residue a polymeric material comprising di-n-butyl fumarate-di-n-butyl maleate copolymer. It was labeled polymer XI.

Example 8

Polymeric bis(ethoxyethyl) fumarate was obtained as a by-product in the esterfication of fumaric acid with ethylene glycol mono-ethyl ether in the presence of sulfuric acid as catalyst. The polymeric bis(ethoxyethyl) fumarate B.P. above 235° C. at 0.6 mm., $n_D^{25}$ 1.4723 was labeled polymer XII.

Example 9

This example shows the results obtained on the polymeric products of Examples 1-9 for plasticizer efficiency.

In respective tests, sixty parts by weight of polyvinyl chloride and forty parts by weight of each of the polymers noted below were mixed on a rolling mill to a homogeneous blend. During the milling there was observed substantally no fuming or discoloration. Molded sheets of each of the milled blends were clear and transparent and substantially colorless. Testing of the molded sheets for low temperature flexibility, volatility, water-resistance and kerosene-resistance by the testing procedure described above gave the following values:

| Polymer number | Low temperature flexibility, ° C. | Percent volatility | Water, solids loss, percent | Kerosene solids loss, percent |
| --- | --- | --- | --- | --- |
| I | −23.4 | 5.80 | 0.199 | |
| II | −4.4 | 0.48 | 0.05 | |
| III | −32.0 | 14.0 | 0.19 | 12.2 |
| IV | −8.2 | 0.8 | 0.02 | 4.8 |
| V | −30.9 | 12.3 | 0.21 | 14.5 |
| VI | −12.8 | 1.1 | 0.02 | 1.2 |
| VII | −11.0 | 13.2 | 0.38 | |
| VIII | −16.6 | 8.1 | 0.24 | 3.74 |
| IX | +4.5 | 0.8 | 0.00 | 0.78 |
| X | −41.7 | 13.1 | 0.3 | |
| XI | −4.6 | 0.54 | 0.00 | 7.11 |
| XII | −29.2 | 2.8 | | |
| Bis(2-ethylhexyl) phthalate | −36.0 | | 0.01 | 87.3 |

The present esters are particularly outstanding in kerosene-resistance. As shown above, bis-(2-ethylhexyl) phthlate a standard commercially available polyvinyl chloride plasticizer, has good low temperature flexibility, but very poor kerosene-resistance.

Example 10

This example provides a comparison of (I) a composition obtained from polyvinyl chloride and a monomeric dicarboxylate with (II) a composition obtained from polyvinyl chloride and a preformed homopolymer of the same dicarboxylate.

A mixture consisting of 35 grams of polyvinyl chloride and 140 grams of diethyl fumarate was heated with stirring for 5 hours. The resulting mixture was poured, with stirring, into 100 ml. of gasoline, stirred for one hour and filtered. The precipitate thus obtained was allowed to dry overnight at room temperature. The dried precipitate was a soft, somewhat sticky rubbery solid.

Employing the herein described volatility test, a molded sheet prepared from said soft solid was found to have a volatility value of 52 percent. The Shore hardness of said molded sheet changed from 30 to 97 during the volatility test. Based on the high volatility value and the great spread in Shore hardness of the soft solid consequent to heating, the diethyl fumarate appears to have functioned as merely a solvent for polyvinyl chloride rather than as a plasticizer therefor.

When an attempt was made to incorporate said soft solid with additional polyvinyl chloride as in Example 9, i.e., by mixing sixty parts by weight of polyvinyl chloride with 40 parts by weight of said solid on a rolling mill, the mixture fumed very heavily during the milling operation. A molded sheet prepared from the milled mixture was not only brittle, indicating inefficient plasticizing but it was also opaque and mottled, indicating incompatibility of the polyvinyl chloride with said solid.

Very good results were obtained, however, when, instead of using the monomeric diethyl fumarate with polyvinyl chloride, a preformed homopolymeric diethyl fumarate was used. A mixture consisting of 258 grams (1.5 moles) of diethyl fumarate and 2.6 grams (1.0% of di-tert-butyl peroxide) was heated for about 30 minutes at a temperature of approximately 166° C. Distillation of the resulting material gave the polymeric diethyl fumarate, B.P. 180-215° C./1.0 mm. Sixty parts by weight of polyvinyl chloride and forty parts by weight of said polymeric diethyl fumarate were mixed on a rolling mill to a homogeneous blend. During the milling there was observed substantially no fuming or discoloration. The resulting blend could be readily extruded and calendered. A molded sheet of the milled blend was clear and transparent and substantially colorless. Testing of the molded sheet for low temperature flexibility and volatility by the testing procedures described above gave a low temperature flexibility value of minus 11.0 and a volatility value of 13.2 percent. The Shore hardness changed only from 77 to 83 during the volatility test.

While the above example shows only a composition in which the ratio of plasticizer to polyvinyl chloride is 40:60, this ratio being employed to get comparable efficiencies, the content of polymeric ester to polyvinyl chloride may be widely varied, depending on the properties desired in the final product. For many purposes a plasticizer content of, say, only 10 percent to 20 percent is preferred. The present polymeric dicarboxylates are compatible with polyvinyl chloride over a wide range of concentration up to 50 percent of the polymeric esters based on the total weight of plasticized composition yielding desirable products.

The plasticized polyvinyl chloride compositions of the present invention have good thermal stability; however, for many purposes it may be advantageous to use known stabilizers in the plasticized compositions. Inasmuch as the present polymeric esters are substantially unreactive with the commercially available heat and light stabilizers which are commonly employed with polyvinyl chloride or copolymers thereof, the presence of such materials in the plasticized products does not impair the valuable plasticizing properties of the polymeric esters. The present polymeric esters are of general utility in softening vinyl chloride polymers. They may be used as the only plasticizing component in a compounded vinyl chloride polymer or they may be used in conjunction with other plasticizers.

This application is a continuation-in-part of my application Serial No. 301,163, filed July 26, 1952, and now abandoned.

What I claim is:

1. A flexible composition comprising polyvinyl chloride plasticized with a preformed dicarboxylate polymer selected from the class consisting of normally liquid homopolymers and normally liquid copolymers of esters of the formula:

ROOCH:CHCOOR' in which R and R' are selected from the class consisting of alkyl radicals of from 1 to 8 carbon atoms and alkoxyalkyl radicals of from 3 to 6 carbon atoms, said homopolymers and copolymers consisting only of said esters in polymerized form, and said polymeric dicarboxylate being from 5% to 50% by weight of the weight of the flexible composition.

2. A flexible composition comprising polyvinyl chloride plasticized with a preformed normally liquid homopolymeric dibutyl fumarate, said preformed homopolymeric butyl fumarate being from 5% to 50% by weight of the flexible composition.

3. A flexible composition comprising polyvinyl chloride plasticized with a preformed normally liquid homopolymeric dibutyl maleate, said preformed homopolymeric dibutyl maleate being from 5% to 50% by weight of the flexible composition.

4. A flexible composition comprising polyvinyl chloride plasticized with a preformed normally liquid homopolymeric di-n-hexyl maleate, said preformed homopolymeric di-n-hexyl maleate being from 5% to 50% by weight of the flexible composition.

5. A flexible composition comprising polyvinyl chloride plasticized with a preformed normally liquid homopolymeric bis(ethoxyethyl) fumarate, said preformed homopolymeric bis(ethoxyethyl) fumarate being from 5% to 50% by weight of the flexible composition.

6. A flexible composition comprising polyvinyl chloride plasticized with a preformed normally liquid copolymer of butyl fumarate and butyl maleate, said preformed copolymer being from 5% to 50% by weight of the flexible composition, said preformed copolymer consisting of polymerized butyl fumarate and polymerized butyl maleate.

References Cited in the file of this patent

UNITED STATES PATENTS 1,945,307   Dykstra _____ Jan. 30, 1934